(12) United States Patent
Arai

(10) Patent No.: US 9,116,689 B2
(45) Date of Patent: Aug. 25, 2015

(54) POWER CONSUMPTION REDUCTION METHOD OF SWAPPING HIGH LOAD THREADS WITH LOW LOAD THREADS ON A CANDIDATE CORE OF A MULTICORE PROCESSOR

(75) Inventor: Hiroki Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 97 days.

(21) Appl. No.: 13/036,495

(22) Filed: Feb. 28, 2011

(65) Prior Publication Data

US 2011/0219246 A1 Sep. 8, 2011

(30) Foreign Application Priority Data

Mar. 4, 2010 (JP) .................................. 2010-047959

(51) Int. Cl.
G06F 1/26 (2006.01)
G06F 1/32 (2006.01)

(52) U.S. Cl.
CPC ........ *G06F 1/32* (2013.01); *Y02B 60/144* (2013.01)

(58) Field of Classification Search
CPC ........................................................ G06F 1/32
USPC ........................................................ 713/320
See application file for complete search history.

(56) References Cited

U.S. PATENT DOCUMENTS

| 7,356,726 | B2 * | 4/2008 | Shimoyama et al. ......... 713/600 |
| 2009/0172424 | A1 * | 7/2009 | Cai et al. ..................... 713/300 |
| 2010/0083010 | A1 * | 4/2010 | Kern et al. ................... 713/300 |
| 2010/0146513 | A1 * | 6/2010 | Song ............................ 718/104 |
| 2010/0287561 | A1 * | 11/2010 | Floyd et al. .................. 718/108 |

FOREIGN PATENT DOCUMENTS

| JP | 2005-285123 A | 10/2005 |
| JP | 2007-148469 A | 6/2007 |
| JP | 2008191949 A | 8/2008 |
| JP | 2009-93383 A | 4/2009 |
| JP | 2009163523 A | 7/2009 |
| WO | 2004044745 A | 5/2004 |

OTHER PUBLICATIONS

Japanese Office Action for JP Application No. 2010-047959 mailed on Jan. 6, 2014 with Partial English Translation.

* cited by examiner

*Primary Examiner* — Thomas Lee
*Assistant Examiner* — Robert Cassity
(74) *Attorney, Agent, or Firm* — Sughrue Mion, PLLC

(57) ABSTRACT

An information processing unit includes a processing unit including a plurality of processor cores; and a power consumption reduction device configured to reduce power consumption of the processing unit. The power consumption reduction device measures the loads on threads that are running in the plurality of cores; checks the number of high load threads which are threads in a high load state and the number of low load threads which are threads in a low load state for each core, on the basis of the measuring results; selects, when there exists a core having high load threads whose number is less than a preset threshold on the number of high load threads, the core as a candidate core; and replaces the high load threads existing in the candidate core with the low load threads existing in other cores when the total number of the low load threads in a core other than the candidate core is not less than the number of the high load threads in the candidate core.

8 Claims, 5 Drawing Sheets

POWER CONSUMPTION REDUCTION METHOD OF SWAPPING HIGH LOAD THREADS WITH LOW LOAD THREADS ON A CANDIDATE CORE OF A MULTICORE PROCESSOR

This application is based upon and claims the benefit of priority from prior Japanese Patent Application No. 2010-047959, filed on Mar. 4, 2010, the disclosure of which is incorporated herein in its entirety by reference.

TECHNICAL FIELD

The present invention relates to an information processing unit including an SMT (Simultaneous Multithreading)-enabled CPU (Central Processing Unit) and its power consumption reduction method capable of realizing power consumption reduction effective for the same only by adding a simple function.

BACKGROUND ART

There is known a CPU including a function of shifting to a power saving state when in a low load condition so as to reduce power consumption. An example of a technique concerning such a CPU is disclosed in PTL 1 (refer to paragraphs [0002] to [0012]). In the technique disclosed in PTL 1, a power-saving control self-diagnostic device stores the number of times of transition to a power saving state as a flag and determines that the operation rate of the CPU is high when the flag is 0, which indicates that the transition to the power saving state has never been performed. When it is determined so, an alarm is issued so as to detect a state where the operation rate of the CPU is high.

CITATION LIST

Patent Literature

{PTL 1} JP-A-2009-163523

SUMMARY OF INVENTION

Technical Problem

As described above, there is known a CPU having a function of shifting to a power saving state when in a low load condition so as to reduce power consumption. Further, there is a case where a CPU having such a function is provided with a plurality of CPU cores.

However, when an SMT function, which allows simultaneously a plurality of threads to run on a single CPU core, is used in the CPU provided with a plurality of CPU cores, a certain problem occurs. That is, a CPU core having even only one high load thread cannot shift to the power saving state.

An exemplary object of the present invention is therefore to provide a power consumption reduction method for an information processing unit having an SMT-enabled CPU, a power consumption reduction device, and a power consumption reduction program capable of allowing even a CPU core having high load threads to shift to a power saving state.

Solution to Problem

According to a first exemplary aspect of the present invention, there is provided an information processing unit comprising: a processing unit including a plurality of processor cores; and a power consumption reduction device configured to reduce power consumption of the processing unit, wherein the power consumption reduction device: measures the loads on threads that are running in the plurality of cores; checks the number of high load threads which are threads in a high load state and the number of low load threads which are threads in a low load state for each core, on the basis of the measuring results; selects, when there exists a core having high load threads whose number is less than a preset threshold on the number of high load threads, the core as a candidate core; and replaces the high load threads existing in the candidate core with the low load threads existing in other cores when the total number of the low load threads in a core other than the candidate core is not less than the number of the high load threads in the candidate core.

According to a second exemplary aspect of the present invention, there is provided a power consumption reduction method for reducing power consumption of a processing unit including a plurality of processor cores in an information processing unit, the method comprising: measuring the loads on threads that are running in the plurality of cores; checking the number of high load threads which are threads in a high load state and the number of low load threads which are threads in a low load state for each core, on the basis of the measuring results; selecting, when there exists a core having high load threads whose number is less than a preset threshold on the number of high load threads, the core as a candidate core; and replacing the high load threads existing in the candidate core with the low load threads existing in other cores when the total number of the low load threads in a core other than the candidate core is not less than the number of the high load threads in the candidate core.

According to a third exemplary aspect of the present invention, there is provided a non-transitory computer-readable medium stored therein a program for enabling a computer to execute a power consumption reduction method for reducing power consumption of a processing unit including a plurality of processor cores in an information processing unit, the method comprising: measuring the loads on threads that are running in the plurality of cores; checking the number of high load threads which are threads in a high load state and the number of low load threads which are threads in a low load state for each core, on the basis of the measuring results; selecting, when there exists a core having high load threads whose number is less than a preset threshold on the number of high load threads, the core as a candidate core; and replacing the high load threads existing in the candidate core with the low load threads existing in other cores when the total number of the low load threads in a core other than the candidate core is not less than the number of the high load threads in the candidate core.

Advantageous Effects of Invention

According to the present invention, replacement of the threads can be made in an appropriated manner, so that it is possible to solve a problem that a CPU core having even only one high load thread cannot shift to the power saving state in an environment where an SMT function is used in a CPU having a plurality of CPU cores.

DESCRIPTION OF EMBODIMENTS

The outline of an exemplary embodiment of the present invention will first be described. In the embodiment of the present invention, first the loads on threads in each CPU core are measured. Then, it is conformed whether there is a high load thread in each CPU core or whether there is a CPU core having a low load thread that can be set as a destination to which a job is migrated. When the both exist, the high load thread is replaced with the low load thread as the job migration destination, and the CPU core that has become a low load state is shifted to a power saving state.

As a result, the CPU can be shifted to the power saving state in an appropriate manner, thus making it possible to reduce power consumption of an information processing unit.

The exemplary embodiment of the present invention will be described in detail with reference to the accompanying drawings.

Figure 1:
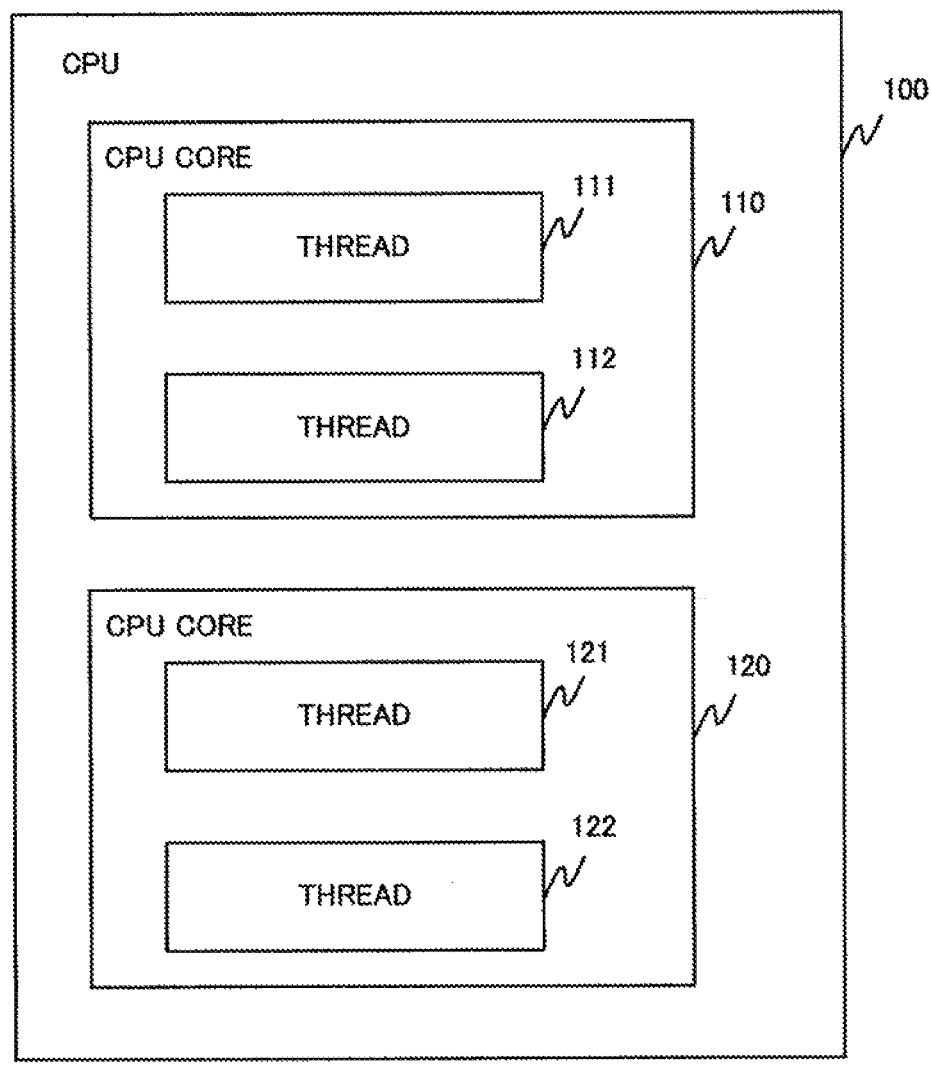
FIG. 1 A view illustrating a basic configuration of an exemplary embodiment of the present invention.

As illustrated in FIG. 1, a CPU 100, which is an exemplary embodiment of the present invention, has a CPU core 110 and a CPU core 120. The CPU core 110 has a function of executing threads 111 and 112 simultaneously, and the CPU core 120 has a function of executing threads 121 and 122 simultaneously. The CPU corresponds to "processing unit" in the present invention, and CPU core corresponds to "core" in the present invention.

Figure 4:
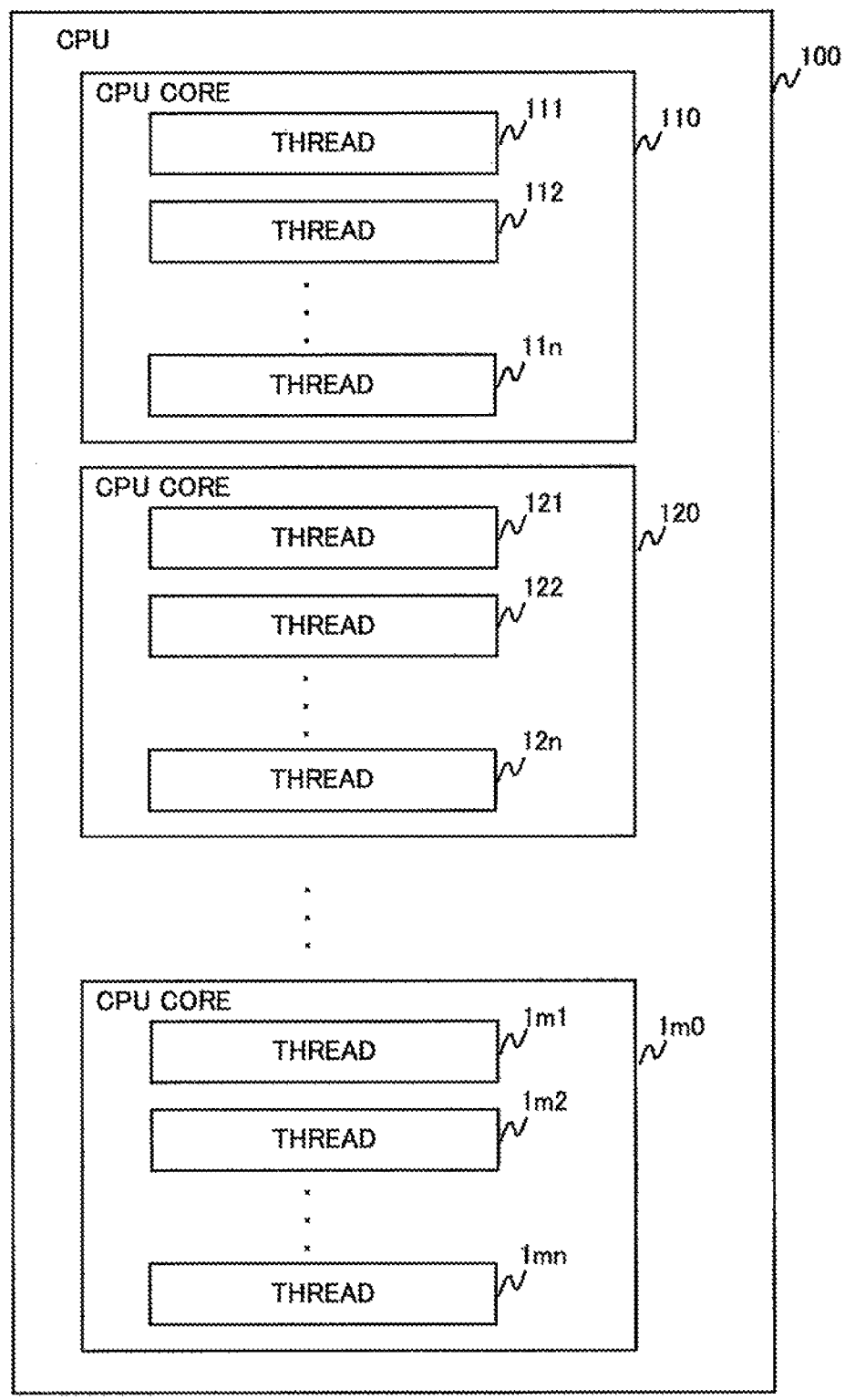
FIG. 4 A view illustrating a configuration example of the exemplary embodiment of the present invention.

For convenience of explanation, a case where one CPU has two CPU cores and each of the CPU cores has a function of executing two threads simultaneously will be described. However, this configuration is just an example and the configuration of the exemplary embodiment is not limited to this. For example, as is clear from FIG. 4, one CPU may have m (arbitrary number) CPU cores. Further, one CPU core may have a function of executing n (arbitrary number) threads simultaneously.

The "n" indicating the number of threads in each CPU is just a symbol representing any number, and "n" sometimes represents the same number and sometimes different numbers.

Figure 5:
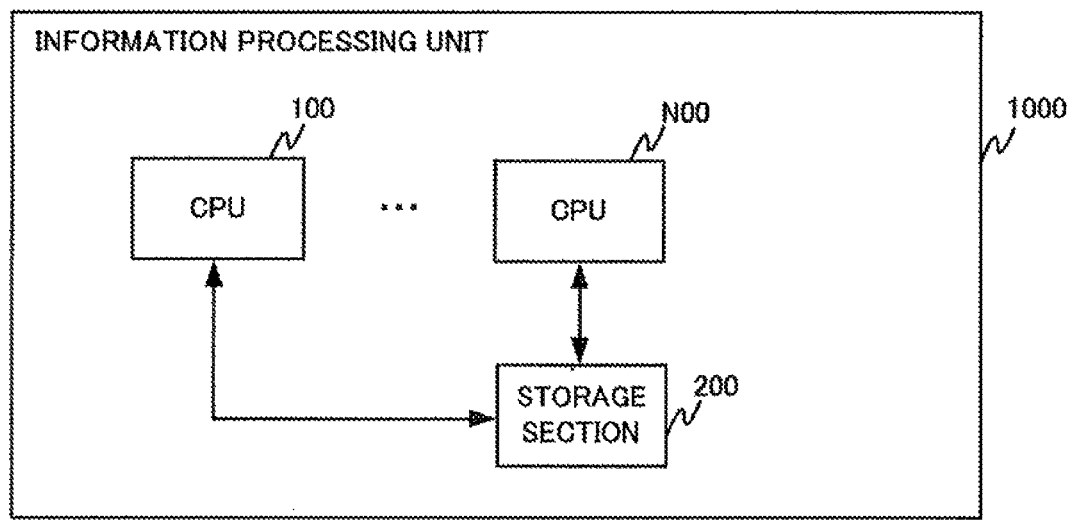
FIG. 5 A view illustrating a configuration example of the exemplary embodiment of the present invention.

Further, as is clear from FIG. 5, one information processing unit (information processing unit 1000 in the example of FIG. 5) may have N (arbitrary number) CPUs. Further, each CPU reads a program from a storage section 200 which is a computer-readable recording medium so as to perform its operation.

Figure 6:
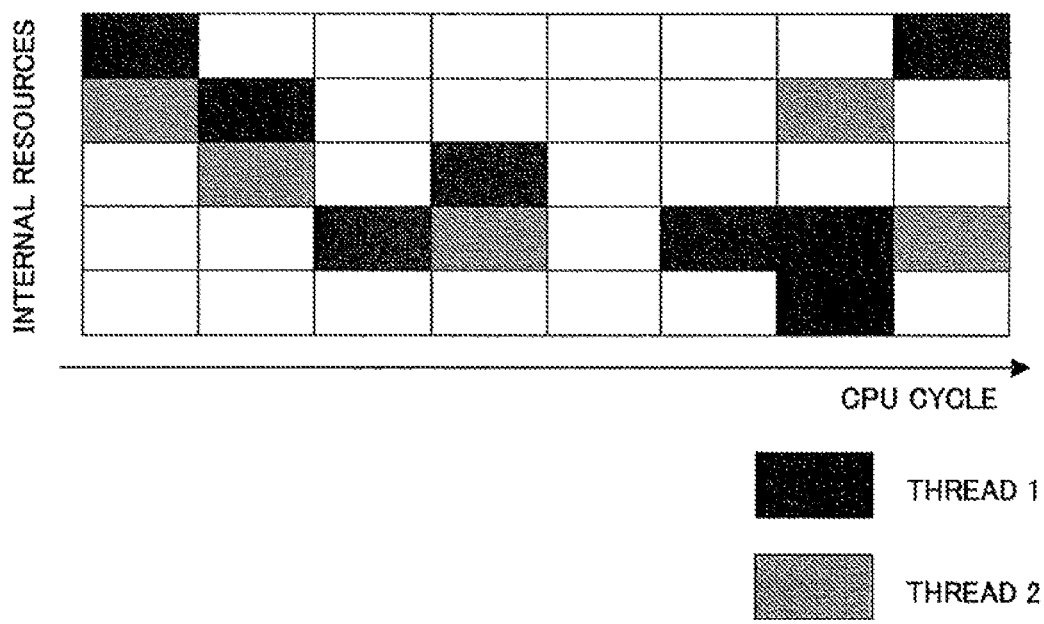
FIG. 6 An image view concerning measurement of loads on threads in CPU in the exemplary embodiment of the present invention.

Next, operation of the present embodiment will be described with reference to the block diagram of FIG. 1, flowcharts of FIGS. 2 and 3, and an image view of FIG. 6.

Figure 2:
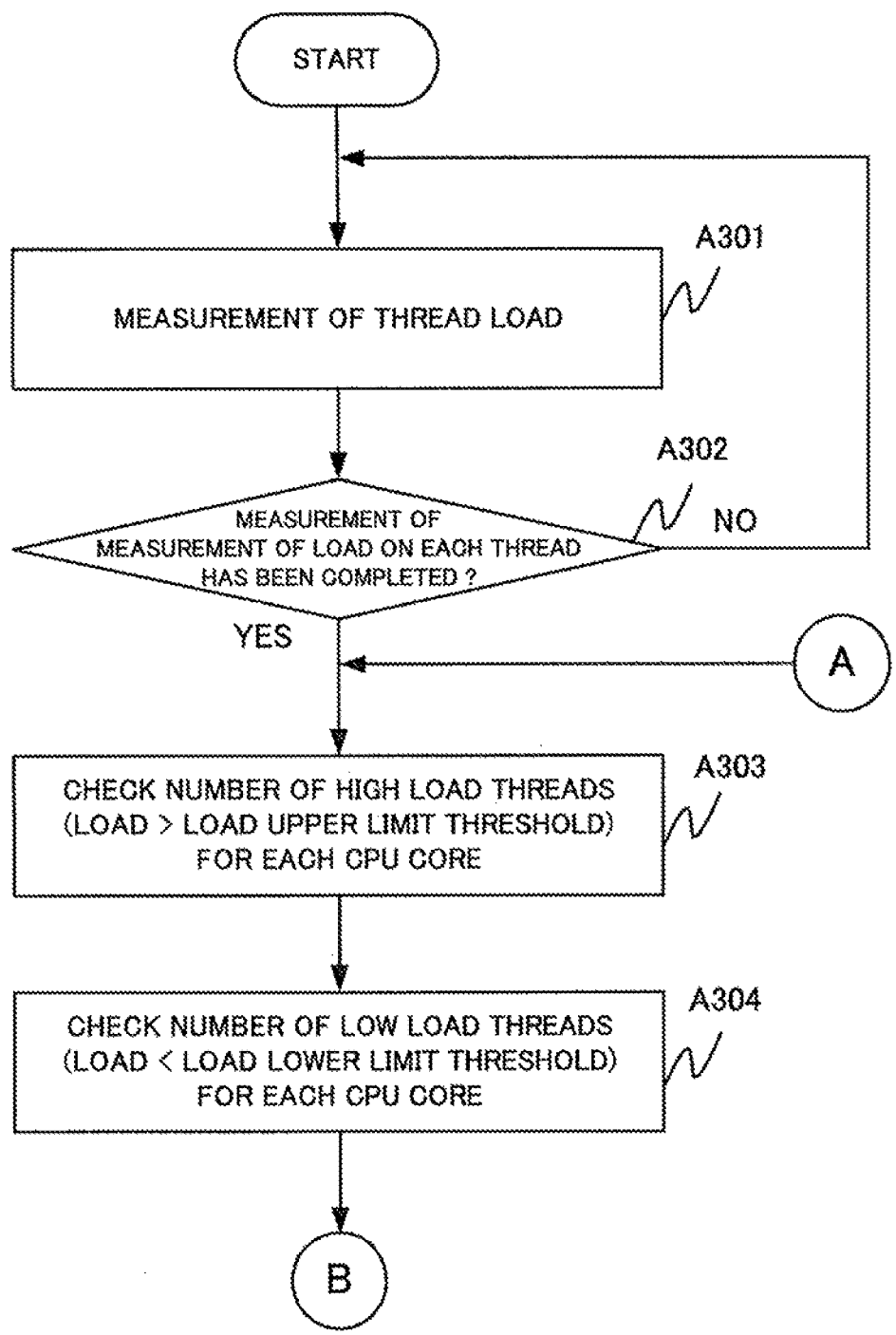
FIG. 2 A view (1/2) illustrating basic operation of the exemplary embodiment of the present invention.
Figure 3:
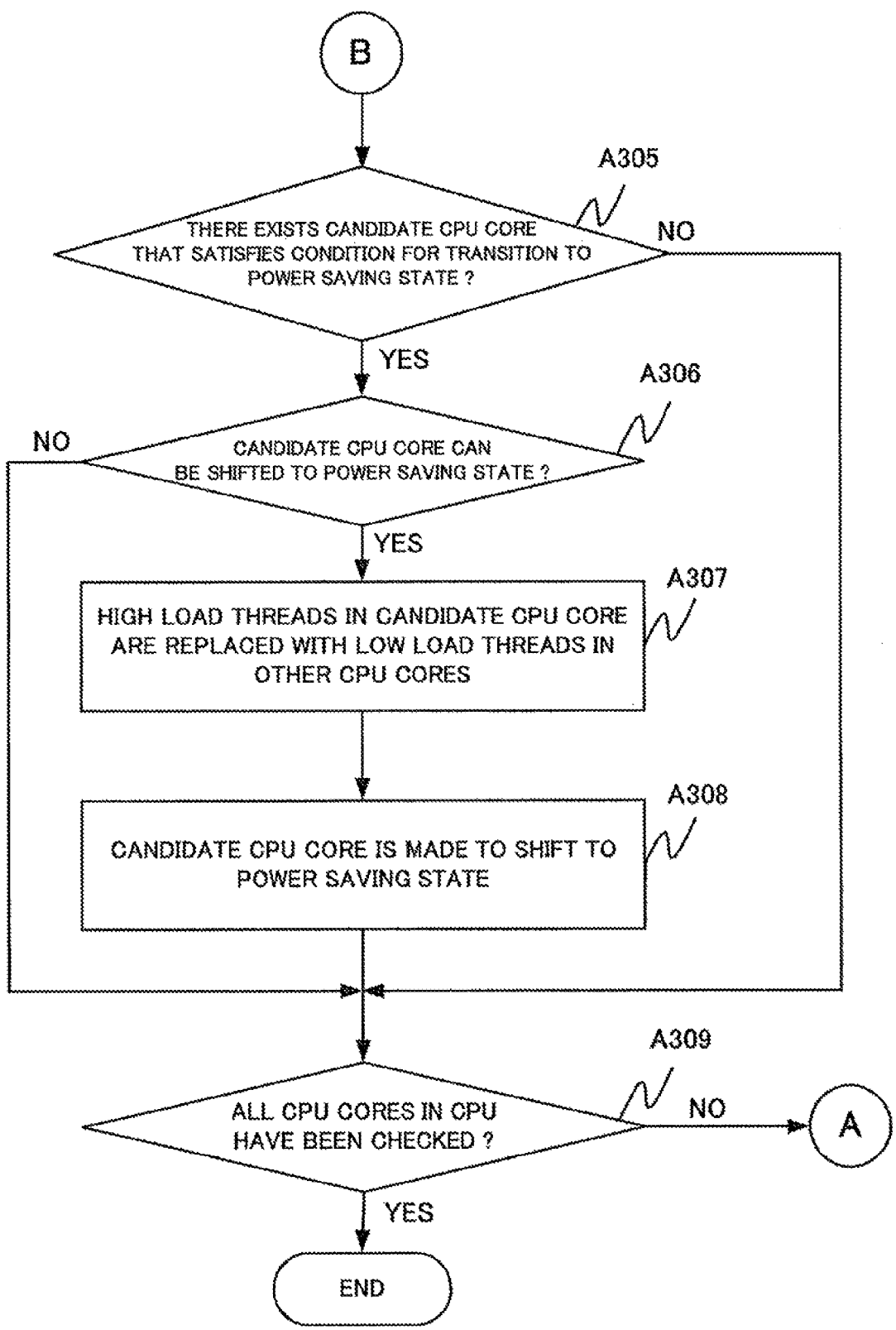
FIG. 3 A view (2/2) illustrating basic operation of the exemplary embodiment of the present invention.

FIGS. 2 and 3 illustrates an operation flow according to which the load on the CPU 100 is measured for transition to the power saving state.

In the present invention, the exemplary embodiment executes the following operations so as to reduce power consumption. The processing of respective operations may be performed by any of cores in each CPU. Further, a hardware and software other than a CPU to be measured may be used to perform the following operations.

(1) First, the loads on the threads in each CPU provided in the information processing unit are measured (step A301). The load on the thread refers to the number of CPU cycles consumed for thread execution within a given period of time. In this regard, a description will be given with reference to FIG. 6. As illustrated in FIG. 6, the use state of internal resources of each thread changes from moment to moment as the CPU cycle advances. Under such a situation, by counting the number of CPU cycles consumed for thread execution within a given period of time, the load on the thread can be measured. The length of the given period of time may arbitrarily be determined by a user. Further, another method may be used to measure the load on the thread as long as the scope of the present invention is not changed.

Then, it is confirmed whether the measurement of the load on each thread has been completed, and the measurement in step A301 is repeated until completion of the measurement (step A302).

(2) The number of high load threads (load>load upper limit threshold) and the number of low load threads (load<load lower limit threshold) are checked for each CPU core (steps A303 and A304). As the load upper limit threshold and load lower limit threshold, arbitrary values may be set by a user. Further, any of the load upper limit threshold and load lower limit threshold may be checked first. Thus, the order of steps A303 and A304 may be interchanged.

(3) Then, a candidate CPU core to be shifted to the power saving state is identified (step A305). This is determined whether the candidate CPU core satisfies a condition (number of high load threads<high load thread number threshold and number of low load threads<low load thread number threshold). As the high load thread number threshold and low load thread number threshold, arbitrary values may be set by a user. In the case where there exists any candidate CPU core that satisfies the condition (YES in step A305), the flow advances to step A306. On the other hand, in the case where there is no candidate CPU core that satisfies the condition (NO in step A305), the flow shifts to step A309.

(4) Then, it is checked whether the candidate CPU core can be shifted to the power saving state (step A306). This is determined whether a condition (total number of low load threads in other CPU cores total number of high load threads in the candidate CPU core) is satisfied. In the case where the condition is satisfied (YES in step A306), the flow advances to step A307. On the other hand, in the case where the condition is not satisfied (NO in step A306), the flow shifts to step A309.

(5) The high load threads in the candidate CPU core are replaced with the low load threads in the other CPU core to make the candidate CPU core shift to the low load state (step A307).

(6) The candidate CPU core is made to shift to the power saving state (step A308).

(7) It is confirmed whether all the CPU cores in the CPU have been checked (step A309). In the case where all the CPU cores in the CPU have been checked (YES in step A309), the flow ends. On the other hand, not all the CPU cores in the CPU have been checked (NO in step A309), the flow shifts to step A303.

With the above operation, the CPU shifts to the power saving state in an appropriate manner, thereby realizing a reduction in power consumption of the information processing unit.

As described above, according to the present exemplary embodiment, the following effects can be obtained.

The first effect is to realize a reduction in power consumption of an information processing unit having an SMT-enabled CPU by adding a simple function. This is because it is possible to easily replace a thread with another thread in an appropriate manner.

The second effect is to realize a reduction in power consumption in accordance with a modification of the configuration of the information processing unit or characteristics of executed software. This is because various conditions such as a threshold or time length for determining the load state of the thread can arbitrarily be changed by a user.

The power consumption reduction device for an information processing unit according to the exemplary embodiment of the present invention can be realized by a hardware. Alternatively, the power consumption reduction device can be realized when a computer reads a program allowing the computer to function as the power consumption reduction device for the information processing unit from a computer-readable recording medium and executes the program.

Further, the power consumption reduction method for an information processing unit according to the exemplary embodiment of the present invention can be realized by a hardware. Alternatively, the power consumption reduction method can be realized when a computer reads a program allowing the computer to execute the method from a computer-readable recording medium and executes the program.

The above exemplary embodiment is a preferred exemplary embodiment of the present invention. However, the present invention is not limited to the above exemplary embodiment but may be variously modified without departing from the scope of the present invention.

The whole or part of the exemplary embodiments disclosed above can be described as, but not limited to, the following supplementary notes.

(Supplementary note 1) A power consumption reduction method for reducing power consumption of a processing unit including a plurality of processor cores in an information processing unit, the method comprising: measuring the loads on threads that are running in the plurality of cores; checking the number of high load threads which are threads in a high load state and the number of low load threads which are threads in a low load state for each core, on the basis of the measuring results; selecting, when there exists a core having high load threads whose number is less than a preset threshold on the number of high load threads, the core as a candidate core; and replacing the high load threads existing in the candidate core with the low load threads existing in other cores when the total number of the low load threads in a core other than the candidate core is not less than the number of the high load threads in the candidate core.

(Supplementary note 2) The power consumption reduction method according to supplementary note 1, wherein the candidate core is made to shift to the power saving state after the replacement of the threads.

(Supplementary note 3) The power consumption reduction method according to supplementary note 1 or 2, wherein, when the candidate core is selected, as the candidate core, a core having high load threads whose number is less than a preset threshold on the number of high load threads existing in a core and having low load threads whose number is more than a preset threshold on the number of low load threads existing in the core is selected.

(Supplementary note 4) The power consumption reduction method according to any one of supplementary notes 1 to 3, wherein a thread to which a load having a value more than an arbitrarily set load upper limit threshold is determined as the high load thread, and a thread to which a load having a value less than an arbitrarily set load lower limit threshold is determined as the low load thread.

(Supplementary note 5) The power consumption reduction method according to any one of supplementary notes 1 to 4, wherein the processing unit is a plurality of processing units provided in the information processing unit, and the method is performed for the plurality of processing units.

(Supplementary note 6) An information processing unit comprising: a processing unit including a plurality of processor cores; and a power consumption reduction device configured to reduce power consumption of the processing unit, wherein the power consumption reduction device: measures the loads on threads that are running in the plurality of cores; checks the number of high load threads which are threads in a high load state and the number of low load threads which are threads in a low load state for each core, on the basis of the measuring results; selects, when there exists a core having high load threads whose number is less than a preset threshold on the number of high load threads, the core as a candidate core; and replaces the high load threads existing in the candidate core with the low load threads existing in other cores when the total number of the low load threads in a core other than the candidate core is not less than the number of the high load threads in the candidate core.

(Supplementary note 7) The information processing unit according to supplementary note 6, wherein the power consumption reduction device enables the candidate core to shift to the power saving state after the replacement of the threads.

(Supplementary note 8) The information processing unit according to supplementary note 6 or 7, wherein, when the candidate core is selected, the power consumption reduction device selects, as the candidate core, a core having high load threads whose number is less than a preset threshold on the number of high load threads existing in a core and having low load threads whose number is more than a preset threshold on the number of low load threads existing in the core.

(Supplementary note 9) The information processing unit according to any one of supplementary notes 6 to 8, wherein the power consumption reduction device determines a thread to which a load having a value more than an arbitrarily set load upper limit threshold as the high load thread, and determines a thread to which a load having a value less than an arbitrarily set load lower limit threshold as the low load thread.

(Supplementary note 10) The information processing unit according to any one of supplementary notes 6 to 9, wherein the processing unit is a plurality of processing units.

(Supplementary note 11) A non-transitory computer-readable medium stored therein a program for enabling a computer to execute a power consumption reduction method for reducing power consumption of a processing unit including a plurality of processor cores in an information processing unit, the method comprising: measuring the loads on threads that are running in the plurality of cores; checking the number of high load threads which are threads in a high load state and the number of low load threads which are threads in a low load state for each core, on the basis of the measuring results; selecting, when there exists a core having high load threads whose number is less than a preset threshold on the number of high load threads, the core as a candidate core; and replacing the high load threads existing in the candidate core with the low load threads existing in other cores when the total number of the low load threads in a core other than the candidate core is not less than the number of the high load threads in the candidate core.

(Supplementary note 12) The non-transitory computer-readable medium according to supplementary note 11, wherein the candidate core is made to shift to the power saving state after the replacement of the threads.

(Supplementary note 13) The non-transitory computer-readable medium according to supplementary note 11 or 12, wherein, when the candidate core is selected, as the candidate core, a core having high load threads whose number is less than a preset threshold on the number of high load threads existing in a core and having low load threads whose number is more than a preset threshold on the number of low load threads existing in the core is selected.

(Supplementary note 14) The non-transitory computer-readable medium according to any one of supplementary notes 11 to 13, wherein a thread to which a load having a value more than an arbitrarily set load upper limit threshold is determined as the high load thread, and a thread to which a load having a value less than an arbitrarily set load lower limit threshold is determined as the low load thread.

(Supplementary note 15) The non-transitory computer-readable medium according to any one of supplementary notes 11 to 14, wherein the processing unit is a plurality of processing units provided in the information processing unit, and the power consumption reduction method is performed for the plurality of processing units.

REFERENCE SIGNS LIST

100, N00: CPU
110, 120, 1n0: CPU core
111, 112, 11n, 121, 122, 12n, 1m1, 1m2, 1mn: Thread
200: Storage section
1000: Information processing unit

The invention claimed is:

1. An information processing unit comprising:
a processing unit including a plurality of processor cores; and
a power consumption reduction device configured to:
reduce power consumption of the processing unit;
measure a load on each of threads that are running in the plurality of cores, by determining a sum of numbers of CPU cycles consumed for execution of said each of threads across a plurality of internal resources of the information processing unit within a given period of time, said plurality of internal resources being other than said plurality of cores, and a configuration of said plurality of internal resources not changing during the load measuring period;
check a number of high load threads which are threads in a high load state and a number of low load threads which are threads in a low load state for each core, on a basis of the measuring results;
select, when a first condition is satisfied that there exists a certain core having high load threads whose number is less than a preset threshold on the number of high load threads, the certain core as a candidate core;
determine whether a second condition that a total number of low load threads existing in one or more cores other than the candidate core is not less than the number of the high load threads in the candidate core is satisfied; and
swap all the high load threads existing in the candidate core with the low load threads spreading over said one or more cores other than the candidate core and then shift the candidate core to a power saving state when the second condition is satisfied, wherein
when the number of the high load threads in the candidate core is greater than one and there exists a plurality of cores, over which the low load threads spread, the swapping of all the high load threads and the low load threads is carried out between the candidate core and each of the plurality of cores other than the candidate core.

2. The information processing unit according to claim 1, wherein,
said condition is that there exists a certain core having high load threads whose number is less than a preset threshold on the number of high load threads existing in the certain core and having low load threads whose number is greater than a preset threshold on the number of low load threads existing in the certain core.

3. The information processing unit according to claim 1, wherein
the power consumption reduction device determines a thread to which a load having a value greater than an arbitrarily set load upper limit threshold as the high load thread, and determines a thread to which a load having a value less than an arbitrarily set load lower limit threshold as the low load thread.

4. A power consumption reduction method for reducing power consumption of a processing unit including a plurality of processor cores in an information processing unit, the method comprising:
measuring a load on each of threads that are running in the plurality of cores, by determining a sum of numbers of CPU cycles consumed for execution of said each of threads across a plurality of internal resources of the information processing unit within a given period of time, said plurality of internal resources being other than said plurality of cores, and a configuration of said plurality of internal sources not changing during the load measuring period;
checking a number of high load threads which are threads in a high load state and a number of low load threads which are threads in a low load state for each core, on a basis of the measuring results;
selecting, when a first condition is satisfied that there exists a certain core having high load threads whose number is less than a preset threshold on the number of high load threads, the certain core as a candidate core;
determining whether a second condition that a total number of low load threads existing in one or more cores other than the candidate core is not less than the number of the high load threads in the candidate core is satisfied; and
swapping all the high load threads existing in the candidate core with low load threads spreading over said one or more cores other than the candidate core and then shifting the candidate core to a power saving state when the second condition is satisfied, wherein
when the number of the high load threads in the candidate core is greater than one and there exists a plurality of cores, over which the low load threads spread, the swapping of all the high load threads and the low load threads is carried out between the candidate core and each of the plurality of cores other than the candidate core.

5. The power consumption reduction method according to claim 4, wherein,
said condition is that there exists a certain core having high load threads whose number is less than a preset threshold on the number of high load threads existing in the certain core and having low load threads whose number is greater than a preset threshold on the number of low load threads existing in the certain core is selected.

6. The power consumption reduction method according to claim 4, wherein
a thread to which a load having a value greater than an arbitrarily set load upper limit threshold is determined as the high load thread, and a thread to which a load having a value less than an arbitrarily set load lower limit threshold is determined as the low load thread.

7. The power consumption reduction method according to claim 4, wherein
the processing unit is a plurality of processing units provided in the information processing unit, and the method is performed for the plurality of processing units.

8. A non-transitory computer-readable medium stored therein a program for enabling a computer to execute a power consumption reduction method for reducing power consumption of a processing unit including a plurality of processor cores in an information processing unit, the method comprising:

measuring a load on each of threads that are running in the plurality of cores, by determining a sum of numbers of CPU cycles consumed for execution of said each of threads across a plurality of internal resources of the information processing unit within a given period of time, said plurality of internal resources being other than said plurality of cores, and a configuration of said plurality of internal resources not changing during the load measuring period;

checking a number of high load threads which are threads in a high load state and a number of low load threads which are threads in a low load state for each core, on a basis of the measuring results;

selecting, when a first condition is satisfied that there exists a certain core having high load threads whose number is less than a preset threshold on the number of high load threads, the certain core as a candidate core;

determining whether a second condition that a total number of low load threads existing in one or more cores other than the candidate core is not less than the number of the high load threads in the candidate core is satisfied; and swapping all the high load threads existing in the candidate core with the low load threads spreading over said one or more cores other than the candidate core and then shifting the candidate core to a power saving state when the second condition is satisfied, wherein when the number of the high load threads in the candidate core is greater than one and there exists a plurality of cores, over which the low load threads spread, the swapping of all the high load threads and the low load threads is carried out between the candidate core and each of the plurality of cores other than the candidate core.

* * * * *